United States Patent [19]
Meiners

[11] 3,717,982
[45] Feb. 27, 1973

[54] CORN DETASSELER HEAD
[75] Inventor: Elmo R. Meiners, Anchor, Ill.
[73] Assignee: M & W Gear Company, Inc., Gibson City, Ill.
[22] Filed: July 6, 1971
[21] Appl. No.: 159,645

[52] U.S. Cl. .................................................56/63
[51] Int. Cl. .............................................A01d 45/02
[58] Field of Search......................56/53, 56–59, 63, 56/500, 320.1, 320.2, 255

[56] References Cited

UNITED STATES PATENTS

| 657,411 | 9/1900 | Hamm | 56/500 |
|---|---|---|---|
| 2,479,510 | 8/1949 | Pollard et al. | 56/500 |
| 2,569,307 | 9/1951 | Haapala | 56/500 |
| 2,621,460 | 12/1952 | Haapala | 56/500 |
| 1,443,872 | 1/1923 | Davis et al. | 56/58 |
| 2,934,882 | 5/1960 | Kaut, Jr. | 56/320.1 |
| 3,011,299 | 12/1961 | Classon | 56/255 X |
| 3,481,124 | 12/1969 | Machovina | 56/255 |
| 3,482,379 | 12/1969 | Splinter et al. | 56/63 |

Primary Examiner—Russell R. Kinsey
Attorney—Molinare, Allegretti, Newitt & Witcoff

[57] ABSTRACT

An improved corn detasseler head unit for mounting on a corn detasseling machine. The head unit includes an open sided conduit or channel for bending and aligning cornstalks with tassels thereon. Cutter blades are disposed at one end of the conduit to sever the tassel from the cornstalks as they pass through the conduit. The improvement comprises a plurality of guide members positioned in the bottom open side of the conduit to guide the cornstalks toward the cutter blades while preventing leaves on the cornstalk from being cut by the cutter blades.

5 Claims, 8 Drawing Figures

PATENTED FEB 27 1973 3,717,982

INVENTOR:
ELMO R. MEINERS
BY
Molinare, Allegretti, Newitt, Witcoff
AT T'YS

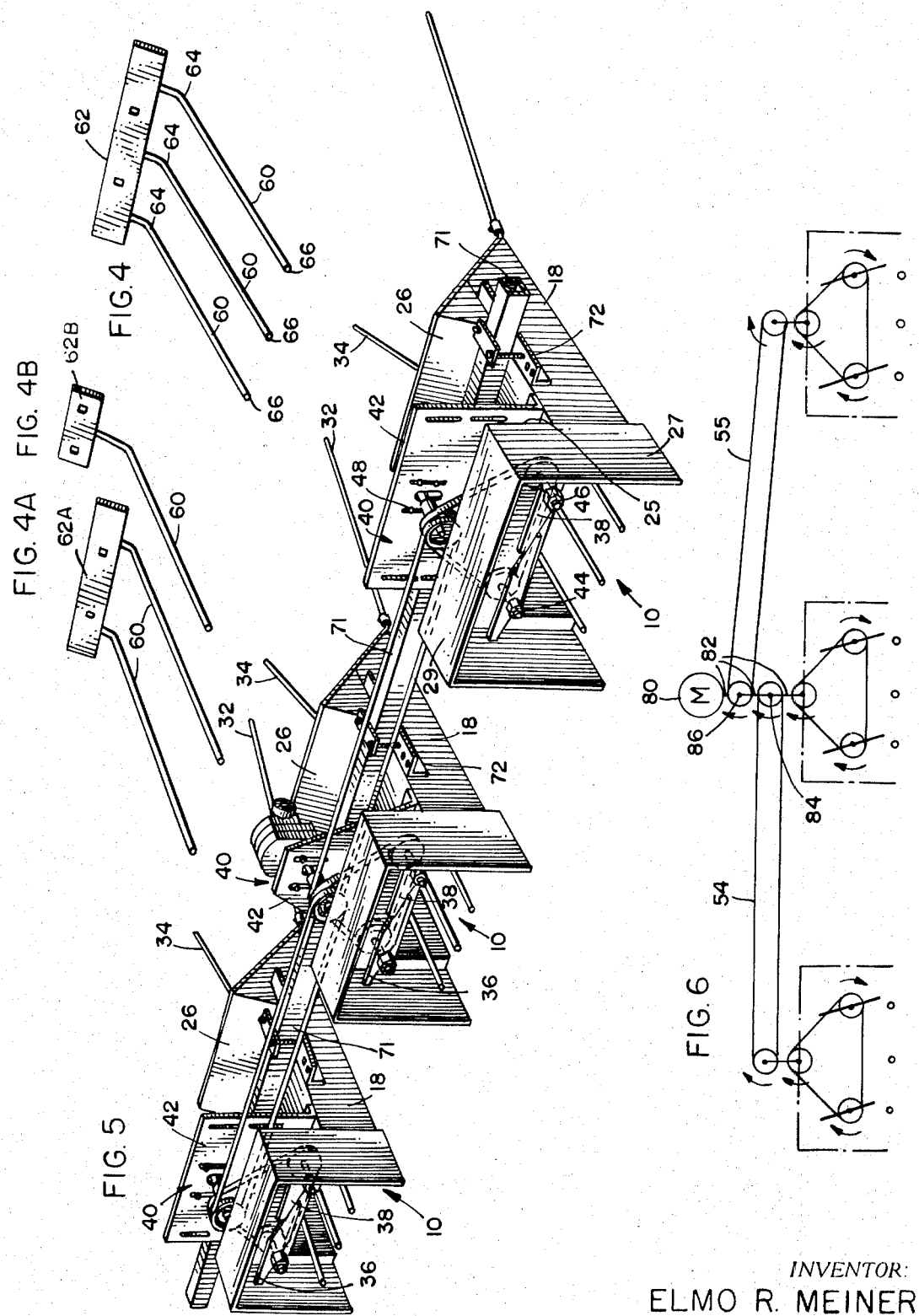

CORN DETASSELER HEAD

BACKGROUND OF THE INVENTION

The invention relates to an improved corn detasseler head unit construction, and more particularly to a plurality of guide fingers disposed within a corn detasseler head unit to segregate and prevent leaves on a cornstalk passing under cutter means in the head unit from being severed from the stalk.

Detasseling is necessary to the development of corn hybrids. Each corn plant has a protruding pollen-bearing flower cluster called the tassel. The same corn plant has a seed producing flower cluster called the ear bud that bears the silks. Ripe pollen falls from the tassel upon the silks and fertilizes the corn plant. Cross pollination is generally accomplished by means of airborne pollen.

Once self-fertilizing or inbred cultures have been developed a farmer can field-cross his plants to create hybrids. This is accomplished by planting alternate rows of parent and pollen-producing plants. For example, eight rows of the parent or self-fertilizing cultures are alternately planted with two rows of pollen producing plants. A pattern of four rows to one row is sometimes followed.

As tassels emerge on the four or eight rows of parent plants the practice was to pull or clip the tassel from the plant. Field workers would walk up and down the rows of corn hand pulling and clipping the tassels from the parent plant. This prevented dissemination of the pollen. In this manner all silks of the parent plant were cross-pollinated by pollen from the adjoining rows of the pollen-producing plants.

Alternatively, all the rows planted could be parent plants. Fertilization could then be accomplished by low-flying airplanes dispersing pollen over the field of the detasseled parent plants. In either event, the crop from the detasseled rows is hybridized seed corn.

It is extremely important that the cornstalk be detasseled with a minimum amount of foliage removal. This is because excessive removal of leaves on the stalks will result in a reduced corn yield and reduced hardiness of the corn plant. No means are disclosed in Sanderson for separating the tassel from the leaves. In particular, when the device is set in a low position to detassel short cornstalks, the higher stalks may be partially stripped of foliage. The cutting means may indiscriminately cut all foliage passing thereunder.

It is therefore desirable to have some means of separating the tassel from the leaves so only the former is cut when passing under the cutter.

SUMMARY OF THE INVENTION

An improved corn detasseler head unit is mounted on a corn detasseling machine. The unit includes an open-ended, open-bottomed cornstalk conduit with cutter means mounted at one end of the conduit. As the unit is drawn over a row of cornstalks, the conduit bends and aligns each cornstalk for accurate severance of the tassel from the top of the stalk. The improvement comprises at least one guide finger disposed on the underside of the open-ended, open-bottomed conduit to separate the leaves from the tassels and thus prevent leaves on the cornstalk from being cut by the cutter means.

An object of this invention is to provide an apparatus which prevents excessive removal of foliage while detasseling a stalk of corn.

A further object of the present invention is to provide means of segregating the tassel on a cornstalk from leaves on a cornstalk.

One further object is to provide a corn detasseling device which can be drawn over a row of stalks which are not uniform in height. The device separates only the tassel from the stalk.

These and other objects, advantages and features of the present invention will be set forth in greater detail in the description which follows.

BRIEF DESCRIPTION OF THE DRAWING

In the detailed description which follows, reference will be made to the drawing comprised of the following figures:

FIG. 4 is a perspective view of the guide means which is attached to the detasseler head unit;

FIG. 4A is a perspective view of an alternative construction for guide means;

FIG. 4B is a perspective view of an alternative construction for guide means;

FIG. 5 is a perspective view of a plurality of improved corn detasseler head units interconnected and driven by a single motor; and FIG. 6 is a schematic illustration of the direction of drive belt and blade rotation for the head units illustrated in FIG. 5.

DESCRIPTION OF THE PREFERRED EMBODIMENT

Figure 1:
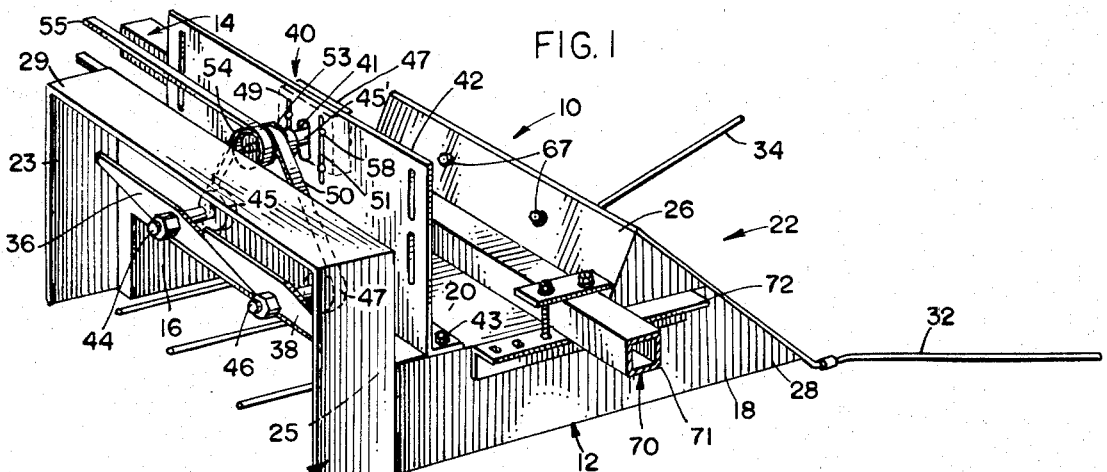
FIG. 1 is a perspective rear view of a single improved corn detasseler head unit illustrating the location of the guide means.

Referring now to the figures wherein like numbers refer to like parts, in FIG. 1 is shown a corn detasseler unit designated generally as 10. The corn detasseler unit 10 is comprised of an open-ended, open-bottom cornstalk channel or conduit 12 with cutter means 14 located at the trailing end of the conduit 12.

The conduit 12 is preferably made of sheet metal and is comprised of two, substantially vertical sides 16 and 18, and a substantially horizontal top 20 interconnecting sides 16 and 18. The bottom of the conduit 12 is open to facilitate entry and guidance of the corn stalks through the conduit 12.

Figure 2:
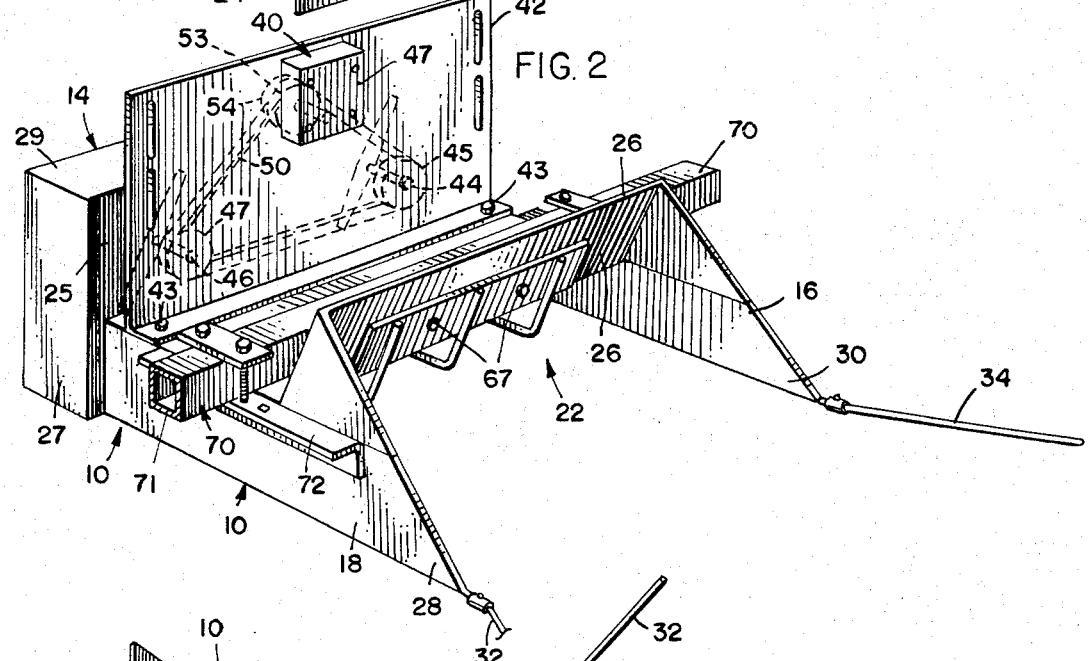
FIG. 2 is a perspective front view of a single improved corn detasseler head unit illustrating the mounting for the guide means.
Figure 3:
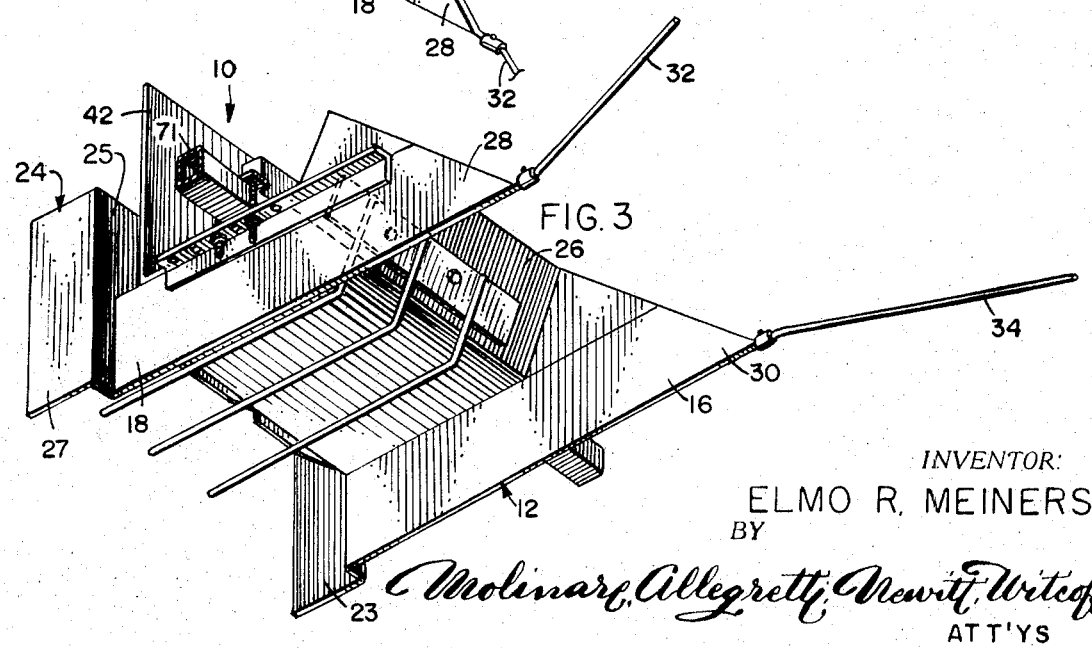
FIG. 3 is a perspective bottom view of a single improved corn detasseler head unit illustrating the configuration of the guide fingers.

The sides 16 and 18 and the top 20 form an open-mouth entrance 22 at the front or leading end of conduit 12. Referring specifically to FIGS. 1 – 3, a sloping top section 26 preferably forms an obtuse angle with the plane defined by top 20. The leading edges of the sides 16 and 18 extend above the plane of top 20 to meet top section 26 and also extend forward to define guide extensions 28 and 30 respectively thereby forming the conduit entrance.

Mounted on the end of extensions 28 and 30 are prongs or cornstalk guide means 32 and 34 respectively. These prongs 32 and 34 guide the cornstalks toward the opensmouthed entrance 22 as the corn detasseler unit is drawn over a row of corn. The open-mouthed entrance 22 bends and guides the stalk into the main part of the conduit 12 beneath the top 20.

Cutter means 14, located at the near or trailing end of conduit 12, is comprised of a cutter blade shroud 24, cutter blades 36 and 38, cutter blade driving means 40 and cutter blade drive mounting means 42.

Cutter blade shroud 24 is preferably constructed of sheet metal and is formed in a rectangular shape to substantially surround and enclose rotating cutter blades 36 and 38. Shroud 24 includes front wall 25, sides 23 and 27 and top 29. An open back permits easy access to the interior of shroud 24 to allow cleaning of severed tassels which might clog the shroud 24.

Front wall 25 has substantially horizontal cutter blade shafts 44 and 46 mounted therein. The blade shafts 44 and 46 extend through both the front and rear side of front wall 25. The shafts 44 and 46 are mounted in bearings to permit rotation about their own axial center line. Pulleys 45 and 47 are mounted on the portion of the shaft 44 and 46 respectively located on the front side of front wall 25. Cutter blades 36 and 38 are mounted on the portion of rotating shafts 44 and 46 respectively which protrude to the rear of front wall 25. Cutter blades 36 and 38 rotate about the center line of shafts 44 and 46 in a substantially vertical plane transverse to the longitudinal axis of conduit 12.

Located in front of front wall 25 of shroud 24 is cutter blade drive mounting bracket 42. Bracket 42, located approximately two inches in front of front wall 25 of shroud 24 is substantially vertical and is constructed of suitable gauge sheet metal. Cutter blade drive mounting bracket 42 is secured to top 20 by suitable mounting means 43. Cutter blade drive mounting bracket 42 has an elongated slot 41 located approximately in the middle and toward the top through which shaft 45' extends. Shaft 45' is rotatably mounted by means of an adjustable bearing bracket 47 mounted on the front side of cutter blade drive mounting means 42. Ball bearing bracket 47 is adjustably fastened through elongated slots 49 and 51 which are parallel to elongated slot 41. Fastening means 53 extend through ball bearing bracket 47 and through slots 49 and 51. By loosening fastening means 58, the ball bearing bracket can be moved up or down as desired.

Mounted on the portion of shaft 45' extending to the rear of cutter blade drive mounting bracket 42 is a pulley 53. Pulley 53 lies substantially the same plane as pulleys 45 and 47. A belt 50 extends over pulleys 53, 45, and 47. Tension in belt 50 is controlled by adjusting ball bearing bracket 47 either upward or downward as required. Shaft 45' has a second pulley 54 located on the same shaft adjacent pulley 53. Pulley 53 is driven from an external source via belt 55.

Alternatively, when only one head unit is in use, ball bearing bracket 47 could be replaced by adjustably mounted drive means (not shown) which would turn shaft 45' which would drive belt 50 and in turn drive the cutting blades 36 and 38.

As best seen in FIGS. 4A and 4B, the invention comprises a mounting base 62 to which one or more rods 60 may be attached. In the embodiment of FIG. 4, base 62 extends transversely across the top section 26. Three guide rods 60 are secured by suitable means to the mounting base 62. Guide rods 60 are about one fourth inch in diameter. Preferably, the steel guide rods 60 are welded to mounting base 62. Guide rods 60 are thus maintained in a parallel, equally spaced relationship with each other. Adjacent the mounting base 62 all three guide rods are bent through an equal angle at bend 64 to define a plane forming an obtuse angle with the plane defined by mounting base 62. Guide rods 60 are maintained in a parallel, equally spaced relation both in front and to the rear of bend 64.

FIGS. 4A and 4B illustrates an alternative construction for mounting the rods 60. In FIG. 4A first mounting plate or base 62A includes two rods 60. In FIG. 4B second mounting plate or base 62B includes a single rod 60. Either of the plates 62A or 62B or both plates 62A and 62B may be fastened to the portion 26 by appropriate fastening means to achieve any desired arrangement of rods 60 over the bottom, open side of the conduit 17. It is also possible to have a single plate associated with each rod 60 thus, permitting almost any arrangement for attachment of rods 60 to portion 26.

Referring to FIGS. 1, 2, and 3, the guide rods 60 are shown mounted in the open mouth entrance 22 of conduit 12. Mounting base 62 is fastened to sloping top section 26 by suitable fastening means 67. As shown, guide rods 60 extend downwardly into the front of the lower side of conduit 12, then at bend 64, the rods 60 continue toward the rear of conduit 12. The guide rods 60 thus comprise a plurality of rods interposed within a lower side of open-ended, open-bottomed conduit 12. Guide rods 60 are positioned substantially parallel to the longitudinal axis but preferably are slightly inclined from the front to the rear of open-ended, open-bottomed conduit 12. As located, guide rods 60 gently guide the leaves and excess foliage around the tassel on the top of the cornstalk downward, away from cutting blades 36 and 38 as the detasseling head unit passes over the bent cornstalk. Guide rods 60 extends slightly past blades 36 and 38 to prevent the leaves and excess foliage which have been gently depressed from springing into the path of cutter blades 36 and 38.

As best seen in FIGS. 1 and 2, means for mounting the improved detasseler head unit are shown as 70. Mounting means 70 preferably comprise a tubular member 71, which extends across the top 20 of conduit 12. Tubular member 71 is secured to angle iron 72 mounted on sides 16 and 18. Any desired number of detasseler head units may be mounted on a particular tubular member 71. Mounting means 70 allows the assembly of a number of corn detasseler devices sitting side by side as illustrated in FIG. 5. An assembly of this nature can easily be mounted for use by securing tubular member 71 to a farm implement. As mounted the implement can be pulled over adjacent rows of corn in a field.

Also illustrated in FIGS. 5 and 6 are pulley and belt arrangements whereby a single motor can drive all the cutter blades of a plurality of corn detasseling head units. Preferably a centrally located motor 80 turns shaft 82 upon which pulleys 84 and 86 are located. Belts 54 and 55 are mounted on pulleys 84 and 86 respectively and transmit rotational motion to the drive shafts of the outside head units. In this manner one motor drives all cutting blades.

While presently preferred forms of the invention have been described for purposes of illustration, it will be understood that this invention may be otherwise embodied within the scope of the following claims.

I claim

1. An improved corn detasseler device comprising at least one head unit means for mounting said head unit above ground level substantially at the height of tassels on a corn stalk, said detasseler being operated by being drawn over a row of cornstalks having tassels thereon so that said head unit cuts said tassels, said head unit including an open-bottomed horizontal conduit with an open front end and an open back end and extending along a longitudinal axis parallel to the direction the device is pulled during operation for partially bending and aligning cornstalks with tassels thereon as said head unit is drawn over said stalk, cutter means disposed at said back end of said conduit, said cutter means disposed substantially transversely to said conduit and operable to cut said bent stalk with a vertical cut to remove said tassel from said stalk, and means for preventing leaves on said cornstalk from being cut by said cutter means, said means being attached to said conduit and including guide means substantially parallel to the longitudinal axis and along said open bottom of said conduit to guide said tassel toward said cutter means.

2. The improved device of claim 1 wherein said guide means comprise at least one rod extending along the longitudinal axis on the open bottom of said conduit.

3. The improved device of claim 1 wherein said guide means comprise a plurality of rods positioned along the longitudinal axis on the open bottom of said conduit.

4. The improved device of claim 1 wherein said guide means are inclined downwardly from the horizontal from the front end to the back end of said conduit.

5. The improved device of claim 1 wherein said guide means comprise a plurality of rods fastened at the front end of said conduit extending along said open bottom to the back end of said conduit.

* * * * *